United States Patent [19]

Hata et al.

[11] Patent Number: 4,790,420
[45] Date of Patent: Dec. 13, 1988

[54] INCHING CONTROL SYSTEM FOR A VEHICLE WITH AUTOMATIC TRANSMISSION

[75] Inventors: Seiichi Hata, Kamakura; Hideo Akima, Yokohama; Kiyoshi Kitagawa, Tokyo; Masaya Hyodo; Koji Niinomi, both of Kariya, all of Japan

[73] Assignees: Fujitsu Limited, Kawasaki; Kabushiki Kaisha Toyoda Jidoshokki Seisakusho, Kariya, both of Japan

[21] Appl. No.: 881,929

[22] Filed: Jul. 3, 1986

[30] Foreign Application Priority Data

Jul. 5, 1985 [JP] Japan .................. 60-148932

[51] Int. Cl.$^4$ ............................................. F16D 13/75
[52] U.S. Cl. ..................... 192/111 A; 192/70.25
[58] Field of Search ............. 192/111 A, 0.075, 0.076, 192/0.094, 30 W, 70.25; 180/53.4, 247

[56] References Cited

U.S. PATENT DOCUMENTS

| | | | |
|---|---|---|---|
| 2,972,906 | 2/1961 | Schroeder | 192/0.075 X |
| 3,240,371 | 3/1966 | Conrad | 180/53.4 X |
| 4,023,660 | 5/1977 | Dickinson | 192/0.075 |
| 4,440,279 | 4/1984 | Schreiner | 192/111 A X |
| 4,497,397 | 2/1985 | Windsor et al. | 192/0.076 |
| 4,561,530 | 12/1985 | Parsons et al. | 192/0.076 |
| 4,592,442 | 6/1986 | Wilson et al. | 180/247 |
| 4,663,992 | 5/1987 | Fujiura et al. | 180/247 X |
| 4,664,239 | 5/1987 | Symes et al. | 192/111 A X |

FOREIGN PATENT DOCUMENTS 60-168921   9/1985   Japan ................ 192/111 A

Primary Examiner—Leslie A. Braun
Assistant Examiner—Richard M. Lorence
Attorney, Agent, or Firm—Staas & Halsey

[57] ABSTRACT

The present invention relates to a vehicle such as a forklift in which a hydraulic pump for driving the fork is driven by the same engine used to provide motive power to the vehicle. A inching control is provided in cases where an automatic transmission is employed for shifting the gears of the vehicle. The inching control controls the clutch to allow separate control of the motive system and cargo handling system of the vehicle. This control must be operated by an operator through the inching pedal. In the fork lift, the clutch plate wears excessively and therefore the relation between the amount of depressing of the inching pedal and engagement of clutch changes abruptly. The present invention discloses a technique to adequately measure the clutch position and for compensating for control of the clutch by always keeping constant the relation between the amount of depression of the inching pedal and the amount of engagement of the clutch.

1 Claim, 5 Drawing Sheets

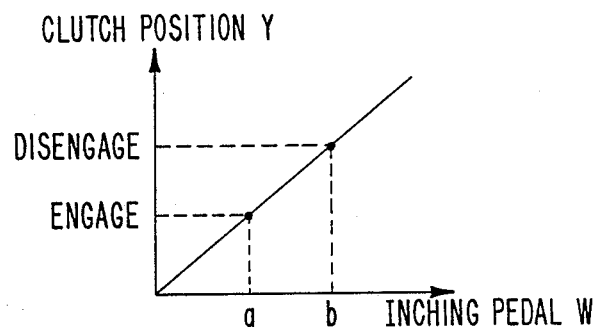
FIG. 5(a) INITIAL STATE
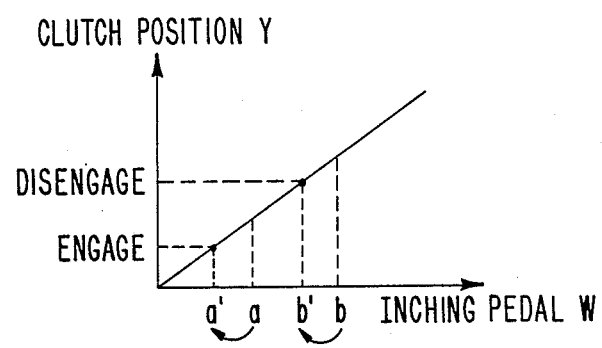
FIG. 5(b) AFTER WORN

INCHING CONTROL SYSTEM FOR A VEHICLE WITH AUTOMATIC TRANSMISSION

BACKGROUND OF THE INVENTION

1. Field of the Invention

The present invention relates to an inching control system in vehicles for industrial use, such as fork lifts, etc. with an automatic transmission and a mechanical clutch, which always assures the proper functioning of the inching pedal operation by automatically compensating for wear of a clutch plate.

2. Background Art

A fork lift is a specially designed vehicle to be used for cargo handling, as is well known. This vehicle is capable of forward and backward movement, as in the case of an ordinary vehicle, and also allows control of the up and down movement of the "fork" for cargo handling. The hydraulic source for driving and lifting the fork is provided power by the engine, which also supplies power for the forward and backward movement. Therefore, when a driver steps on the accelerator in order to increase the lifting speed of fork, the vehicle speed also increases. The inching operation is necessary to allow lifting of the fork while the fork lift is stopped or moving very slowly.

In conventional manual operation type fork lifts, such inching operation is carried out by stepping on a clutch pedal. For example, when the clutch is set to the OFF state (disengaged) by sufficiently stepping on the clutch pedal, the vehicle itself does not move even when an operator steps on the accelerator pedal, and the fork can be lifted up at a high speed. Moreover, it is also possible for the vehicle to be moved slowly, or "inched", by setting the clutch to a half-clutch position (partially engaged) by reducing the pressure applied to the clutch pedal. Such an inching operation requires skill on the part of the operator. To ease the burden on the operator many conventional fork lifts are provided with automatic transmissions. A fork lift with an automatic transmission, which has a mechanical clutch is explained above, is not provided with a clutch pedal, and therefore an inching pedal must be provided exclusively for inching control. FIG. 4 shows the basic construction of a vehicle of this type. In FIG. 4, 1 denotes an engine; 2, a mechanical clutch; 3, an automatic transmission; 4, a differential gear; 5, wheels; 6, a control unit (such as microcomputer, etc.) which controls clutch 2 and automatic transmission 3, etc.; 3, a clutch drive actuator; 8, a clutch stroke (position) detection sensor utilizing a potentiometer; 9, an inching pedal; 10, a sensor which detects a degree of stepping on the inching pedal; 11, an accelerator pedal; 12, a sensor which detects a degree of stepping on the accelerator pedal; 13, a hydraulic pump; 14, a hydraulic cylinder; 15, a cargo handling fork.

The automatic transmission 3 engages gears just like an ordinary manual transmission, but the shifting takes place automatically, the shifting to gears of different gearing ratios being carried out by actuator 7, which is controlled by a signal sent from the control unit 6. The controller 6 is the electronic equivalent of a shift lever in a manual transmission system. When the fork lift is put in motion, the operations of clutch 2 for OFF (i.e., disengaged), half-clutch (partially engaged) and ON (i.e., engaged) conditions are controlled by the actuator 7 and the control unit 6. Therefore, like an automatic transmission vehicle utilizing a torque converter, the automatic transmission vehicle utilizing a clutch and gear transmission as shown in FIG. 4 does not require a clutch pedal. However, such a vehicle can not realize inching control. Therefore, a pedal (inching pedal), which has a similar function as a clutch pedal, is provided in order to realize inching control.

The inching pedal 9 is not mechanically coupled with the clutch 2, and controls the clutch with a servo control system. Namely, a degree of deflection W of the inching pedal 9 is detected by the sensor 10 and input to the control unit 6 to allow a target value for servo control to be determined. The position Y of clutch 2 operated by the actuator 7 is detected by the sensor 8 and is fed-back to the control unit 6. The control unit 6 drives the actuator 7 until the actual clutch position Y reaches the target value as determined by the degree of deflection W of the inching pedal 9.

Automatic transmissions using a dry type single plate clutch and gear transmission are known, such as those employed in passenger cars. In this system, a driver is required to operate the accelerator pedal. Since the transmission is automatic, a clutch pedal and gear change lever are not provided (a lever for selecting the running mode is provided). A control circuit, including a microcomputer, senses the amount of travel of an accelerator pedal due to stepping on the accelerator pedal, the speed of the vehicle, the number of revolutions of engine (tachometer function), gear position and clutch position, etc. Moreover, when the microcomputer judges, based on such data, that the driver intends to accelerate, it opens the throttle and shifts the gears automatically when the number of rotations of engine reaches a specified value. For upshifting, the clutch is once set to OFF (clutch disengaged), the gear is shifted to the next stage through the neutral and the clutch is again smoothly coupled (clutch engaged). On the contrary, when the control unit determines that the operator intends to decelerate, it shifts down the gears.

Although the details of actual construction are different, the transmission of a fork lift is identical in principle. The difference is that a high power hydraulic pump for moving the fork is driven by the engine, and the inching pedal is provided. If a hydraulic pump is used in the automatic transmission of a passenger car, the hydraulic pump must be driven, but since a large output is not required, problems do not occur.

If the clutch 2 is of the mechanical type, the clutch will wear with continued use. This wear will affect the point at which the clutch is engaged or disengaged. A fork lift is in the half-clutch condition for much longer periods than ordinary vehicles. This is because it is stopped, started and inched repeatedly in a short period of time. Therefore, when the clutch is new, (when the amount of stepping on the inching pedal corresponds to the clutch position as shown in FIG. 5(a)), a first amount (a) of stepping on the inching pedal corresponds to clutch ON, while a second amount (b) corresponds to cluch OFF. After a period of use, however, the relation changes as shown in FIG. 5(b). Namely, the amount a' of stepping on the inching pedal corresponds to clutch ON, while the amount b' to clutch OFF, and amount (a) results in the halfclutch condition. Although differences result depending on the operating conditions to which a fork lift is subjected, such wear on the clutch may sometimes be so extreme that clutch plates must be changed daily. In this case, a large deviation in operation of the inching pedal occurs, and it is no longer possible to smoothly and precisely operate the fork lift. Particularly, a problem occurs in safe operation because there is a large deviation between operation before and after the clutch plate is exchanged.

SUMMARY OF THE INVENTION

The present invention provides an inching control system for a vehicle having an automatic transmission, comprising a control unit which controls the clutch by the amount of stepping on the inching pedal (defined as a target value) while sensing the mechanical clutch position as a feedback value, wherein a table, which outputs a corrected clutch position utilizing the half clutch position as the constant clutch position, is provided. The corrected clutch position is obtained by accessing the corrected clutch position table and comparing it with the detected clutch position. Control is carried out so that the corrected clutch position matches the amount of stepping on the inching pedal.

BRIEF DESRIPTION OF THE DRAWINGS

FIGS. 1(a)-1(c) are graphs showing the principle of the present invention.

FIGS. 2(a)-2(b) are flow charts illustrating an embodiment of the present invention.

FIG. 5(a)-5(b) are graphs showing an inching control system according to the present invention.

DETAILED DESCRIPTION OF THE INVENTION

The amount of wear of a clutch can be gauged by displacement of half-clutch position. Therefore, in such a control that the amount of stepping on the inching pedal does not correspond directly to the clutch position but actually detected half clutch position corresponds to the reference corrected clutch position (constant), the same coupling amount of clutch can always be realized for the same amount of stepping on the inching pedal and influence of wearness of clutch can be absorbed.

Figure 1A:
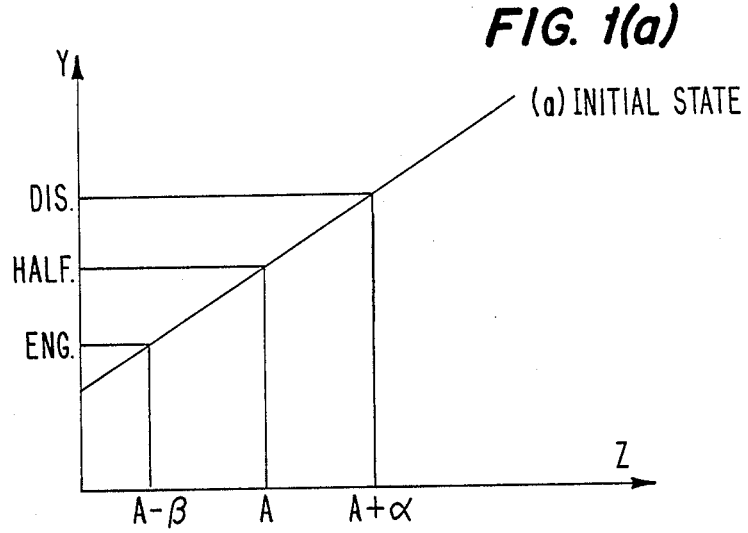
Figure 1B:
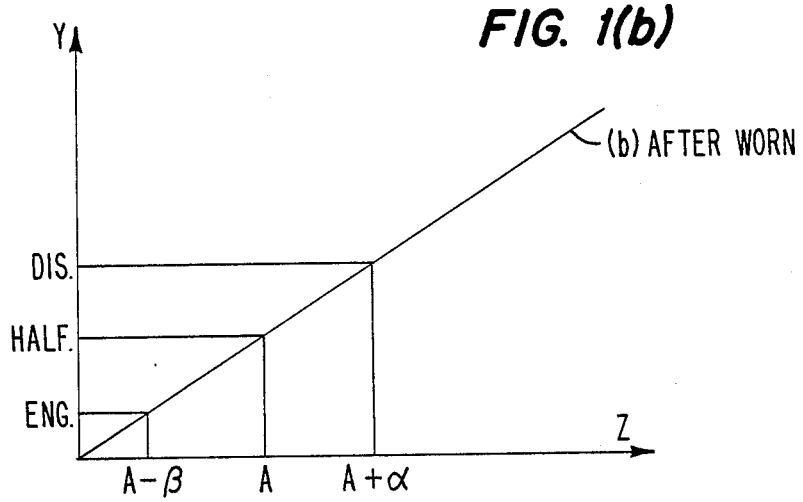
Figure 1C:
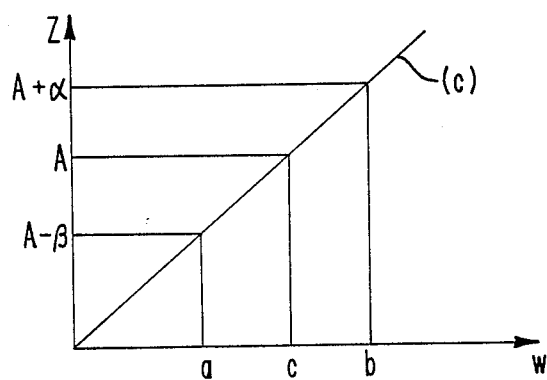
Figure 4:
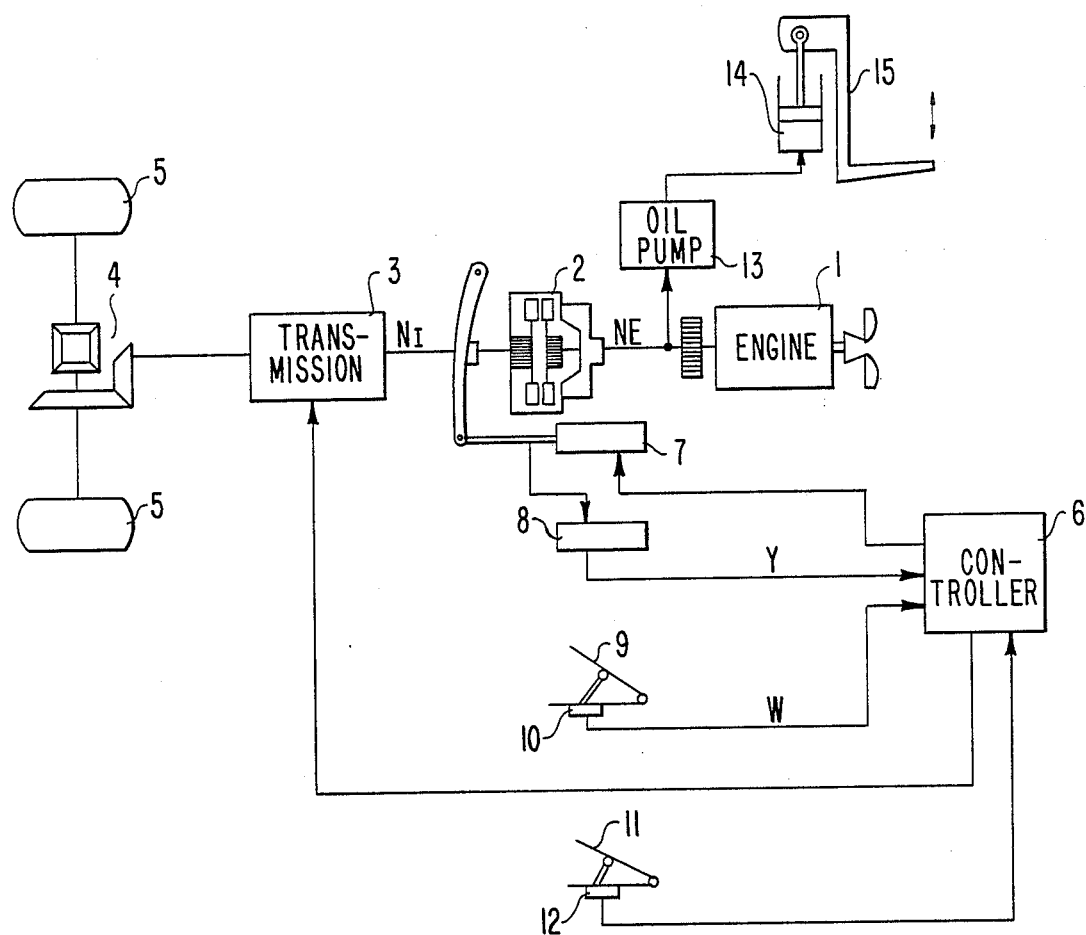
FIG. 4 is a structural view of vehicle providing the automatic transmission.

FIGS. 1(a)-1(c) are graphs showing the principle of the present invention. FIG. 1(a) and FIG. 1(b) respectively show the relation between the clutch position Y and the corrected clutch position Z with reference (constant value) to the half clutch position in the initial state and after the clutch has worn. FIG. 1(c) shows the relation between the corrected clutch position Z with reference to the half clutch position and the amount W of depressing the inching pedal. As shown in FIG. 1(a), (b), the relation between the clutch position Y detected by the sensor 8 shown in FIG. 4 and the clutch ON-OFF condition corresponding thereto is different in the initial condition than in the successive condition where the clutch is worn. Initially, the clutch becomes disengaged after it is operated sufficiently by the actuator 7, but when the clutch has worn, it becomes disengaged even with a small amount of operation. Therefore, a conventional system, which indicates the clutch position Y simply by the amount of depression of the inching pedal, directly receives the influence of clutch wear and thereby the operator's perception of a half clutched condition may be in error. Therefore, by the present invention, the half clutch condition is detected and it is considered as the half clutch position A of the corrected clutch position Z. The values $+\alpha$ and $-\beta$ are considered as the clutch OFF (i.e., disengaged) position and clutch ON (i.e., engaged) position, respectively, at said clutch position Z. If the clutch OFF position $(A+\alpha)$ and clutch ON position $(A-\beta)$ respectively correspond to the amount of depression of the inching pedal b and a ($(A+\alpha$ at b is designated as OFF, while $A-\beta$ is designated at ON), when the amount of depression of the inching pedal is c, the half clutch condition A is obtained and the half clutch condition can always be realized with the same amount of depression of the inching pedal.

The actual half clutch position can be detected by reading an output of the clutch position sensor 8 when a particular clutch condition appears. The particular half-clutch condition can be defined, for example, as the condition where if a vehicle starts to run from a stopped condition, the clutch position is changed to ON from OFF and a difference between a number of rotations of drive shaft in the side of engine and a number of rotations of drive shaft in the side of wheels is of a specified value. The amount of depression of the accelerator pedal is also monitored and the brake must be released. Since the fork lift often repeats start and stop operations, measurement for half clutch position can be done frequently. Limitation on the measuring conditions is necessary for more accurate measurement, and it is recommended in such a case where the measuring conditions are not easily satisfied that a switch for designating a measuring mode be provided and that the control unit 6 output the predetermined conditions in this mode and measurement of the half clutch position is carried out under said conditions. It is desirable that the clutch position be read when the throttle is opened to a predetermined angle, the gears are in neutral, the clutch is set to ON from OFF at a predetermined moving speed, and the difference between number of rotations of drive shafts in engine and the number of rotations of the wheels of the clutch reaches a predetermined value.

Values $\alpha$ and $\beta$ may be fixed or variable in accordance with the clutch position as the coefficients for clutch position Y at the half clutch condition. In the following example, $\alpha$ and $\beta$ are fixed. Relation between the actual clutch position Y and the corrected clutch position Z are stored, in tabular form, into ROM (read-only-memory) and the corrected clutch position Z is obtained as a feedback amount of servo system by making an access to the table with the servo system by making an access by the sensor 8). Several tables of the type mentioned above are prepared in advance in accordance with the value of half clutch positions Y actually measured and it is used after selection in prepare only one table and add a value, which changes in accordance with the wear of the clutch, to the corrected clutch position Z detected from the table. For example, if the difference between a current measured value and the initial value of the half clutch position is $\Delta A$, the corrected clutch position can be obtained by adding $\Delta A$ to the value read from the table.

PREFERRED EMBODIMENT OF THE INVENTION

Figure 2A:
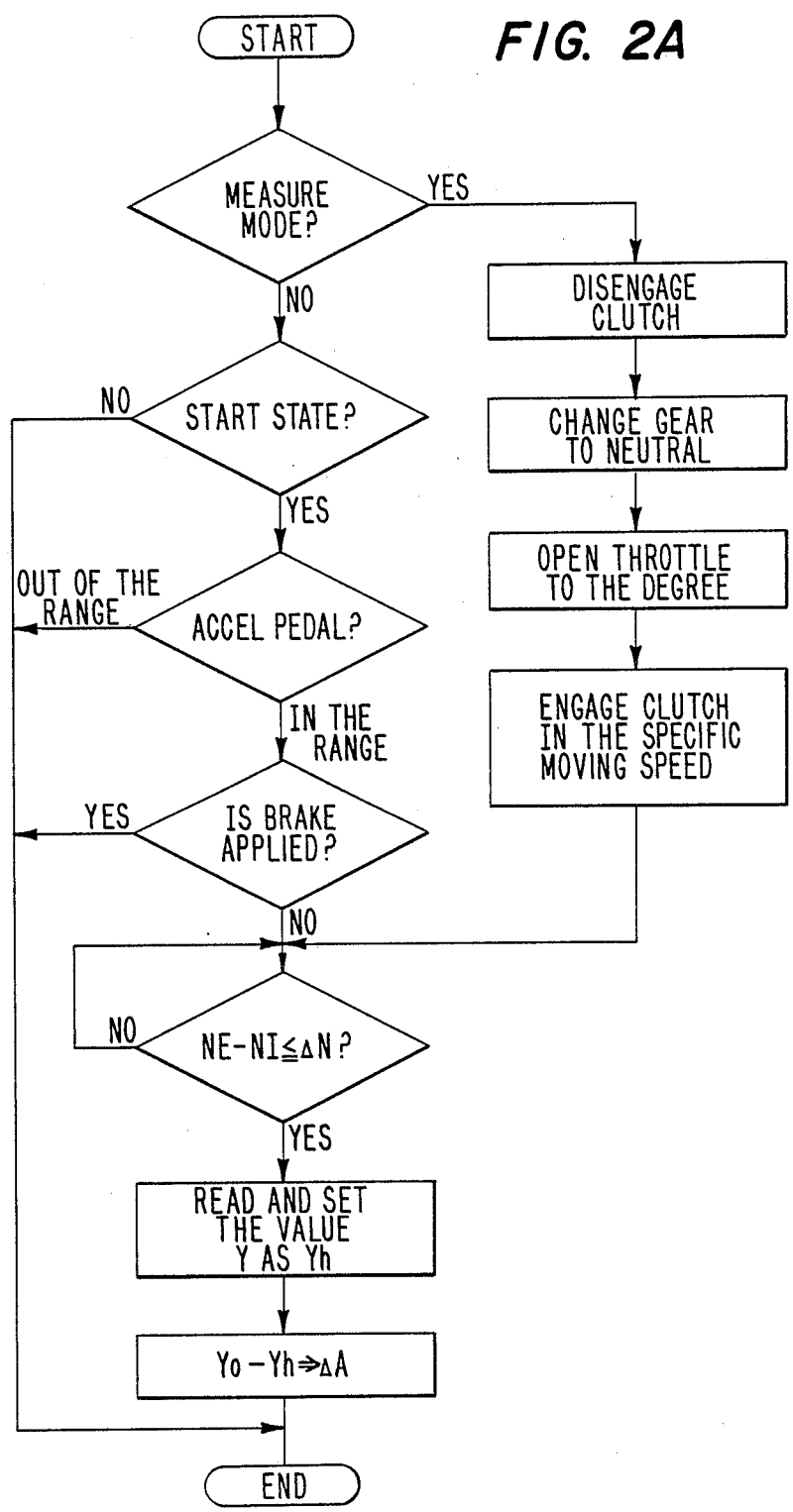

FIG. 2A is an example of a flow chart illustrating the half clutch position measuring processes of the present invention.

First, the computer determines whether the measuring mode is designated. If the measuring mode is not designated, the computer determines if the starting condition is designated. If the vehicle is in the start mode, the computer determines whether the amount of travel of the accelerator pedal is within the specified range. When it is in the specified range, the computer determines if the brake is reset. If the brake is reset, the operation remains as it is until the difference between a number of rotations of the engine side $N_E$ of the clutch and the number of rotations of the transmission side $N_I$ of the clutch reaches the predetermined value of less $\Delta N$. When $N_E - N_I \leq N$, the sensor 8 reads the clutch position Y and it is set as Yh. Here, a difference $\Delta A$ between the initial value $Y_o$ of the half clutch position and Yh is obtained. This value $\Delta A$ corresponds to wearness of clutch.

When the measurement mode is designated, the clutch is first turned OFF, the gears put in neutral, the throttle is closed to the specified angle and the clutch is moved toward the ON direction at the specified speed. The operations after $N_E - N_I \leq \Delta N$ are the same as those explained above. In other cases, this routine immediately terminates. This routine is started for every constant period (several milliseconds to several hundreds of milliseconds).

Figure 2B:
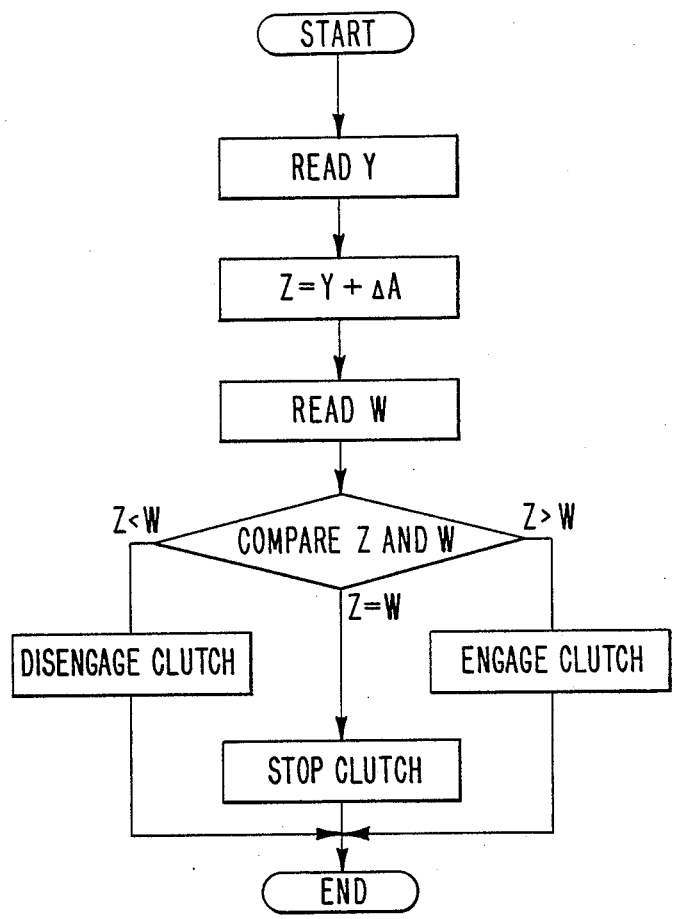
Figure 3:
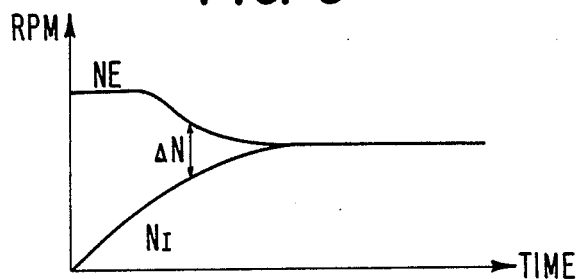
FIG. 3 is a graph of an example of the half-clutch detecting method.

FIG. 2B is an example of a flow chart for inching control. The clutch position Y is first read and the corrected clutch position $Z = Y + \Delta A$ is obtained. An amount W of depressing of the inching pedal is read and it is compared with Z. When $Z = W$, the clutch is not moved and this routine terminates. If $Z > W$, the clutch is moved toward the ON direction. If $Z < W$, the clutch is moved toward the OFF direction. This processing routine is also started for every constant period. The clutch may be moved a constant distance in each process of the processing routine or may be moved continuously until the next instruction is issued.

In place of converting the clutch position Y, detected by the sensor 8 as described above, to the corrected clutch position Z by making reference to the table provided to the control unit 6 and then controlling the actuator 7 so that it becomes equal to amount W of depression of the inching pedal, it is also possible that the amount W of stepping on the inching pedal is converted to the corrected clutch position Z (such table is provided previously to the control unit 6) and the actuator is controlled so that the corrected clutch position Z becomes equal to the clutch position Y detected by the sensor.

As explained heretofore, the present invention detects the actual half-clutch point and corrects the clutch position as the feedback actual amount and therefore provides an advantage that the inching can be controlled by always operating the inching pedal with the same pressure.

What is claimed is:

1. An inching control system for a vehicle including an automatic transmission, a clutch, gears, an actuator which drives the clutch, a controller which controls the actuator, an engine, and an inching pedal, comprising:

means for detecting an amount of depression of the inching pedal and for controlling an amount of engagement of the the clutch by operating the clutch in accordance with said amount of depression on the inching pedal, means for measuring the clutch position and, means for correcting the amount of engagement of the clutch based on said measured clutch position by fixing a relation between the amount of depression of the inching pedal and the engagement of said clutch as constant.

* * * * *

UNITED STATES PATENT AND TRADEMARK OFFICE
CERTIFICATE OF CORRECTION

PATENT NO. : 4,790,420
DATED : December 13, 1988
INVENTOR(S) : Hata et al.

It is certified that error appears in the above-identified patent and that said Letters Patent is hereby corrected as shown below:

```
Front Page [57] ABSTRACT, line 1, after "vehicle" insert --,--;
                 line 6, after "control" insert --means--.

line 49, "3" should be --7--.
Col. 4,   line 7, "at" should be --as--;
          line 47, "servo system by" should be --clutch position
                   Y (as sensed--;
          line 48, delete "making an access";
          line 51, delete "prepare only";
          line 52, delete "one table and add a value, which
                   changes in";
          line 53, after "the" (first occurrence) insert
                   --measured value.  It is enough to prepare
                   only one table and add a value, which
                   changes in accordance with the--.
```

Signed and Sealed this

Thirtieth Day of May, 1989

Attest:

DONALD J. QUIGG

Attesting Officer

Commissioner of Patents and Trademarks